(12) United States Patent
Mehring

(10) Patent No.: US 7,625,173 B2
(45) Date of Patent: Dec. 1, 2009

(54) INLET PLENUM FOR GAS TURBINE ENGINE

(75) Inventor: Carsten Ralf Mehring, Ladera Ranch, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 541 days.

(21) Appl. No.: 11/636,756

(22) Filed: Dec. 11, 2006

(65) Prior Publication Data

US 2008/0138207 A1    Jun. 12, 2008

(51) Int. Cl.
 *F04D 29/70* (2006.01)
(52) U.S. Cl. .................. 415/121.2; 415/185; 55/306; 60/39.092
(58) Field of Classification Search ............. 415/185, 415/202, 184, 205, 208.1, 183, 182.1, 191, 415/120, 121.2; 55/306; 137/15.1
See application file for complete search history.

(56) References Cited

U.S. PATENT DOCUMENTS 2,770,009 A * 11/1956 Rogal et al. ............. 415/121.3
6,959,552 B2 * 11/2005 Leblanc ....................... 60/772

* cited by examiner

*Primary Examiner*—Richard Edgar
(74) *Attorney, Agent, or Firm*—Stephen G. Mican

(57) ABSTRACT

An inlet plenum for coupling airflow from a radial airflow inlet to an axial compressor inlet for a compressor comprises a perforated inlet (PI) baffle that comprises a generally cylindrical baffle that circumscribes the compressor inlet and a plurality of apertures, each aperture perforating the baffle to pass the airflow from the radial airflow inlet to the compressor inlet and a plurality of stagnation vanes, each stagnation vane comprising a generally arc-shaped vane that extends proximate the PI baffle to establish an approximation of stagnant flow around the entire PI baffle to reduce flow distortion of the airflow between the radial airflow inlet and the axial compressor inlet.

17 Claims, 3 Drawing Sheets

INLET PLENUM FOR GAS TURBINE ENGINE

FIELD OF THE INVENTION

The invention relates to an air supply system for a gas turbine engine, and more particularly to an inlet plenum for a gas turbine engine compressor.

BACKGROUND OF THE INVENTION

The performance of turbomachinery, such as a centrifugal compressor for a gas turbine engine, is partially dependent upon the quality of flow that such turbomachinery receives. In particular, it is important to minimise pressure loss and distortion of flow that enters the impeller of such centrifugal compressors in order to maximise efficiency and minimise noise.

Proper inlet design is a particular challenge for a gas turbine engine that has a radial inlet duct that couples airflow to an axial compressor impeller inlet by way of an inlet plenum that receives the airflow from the inlet duct and guides it to the compressor inlet plane. Such an arrangement is common for an aeronautical auxiliary power unit due to space constraints.

In order to keep flow-distortion at the plenum outlet to the compressor impeller to a minimum, the inlet plenum may comprise one or more inlet guide vane passages to help guide the airflow. Such guide vanes offer no barrier to ingestion of foreign matter in the airflow that may damage the compressor impeller, so such an arrangement also may comprise a foreign object damage (FOD) barrier or screen positioned in the airflow upstream of the guide vanes to prevent the ingestion of foreign matter by the compressor impeller. Such a FOD barrier or screen typically comprises a wire screen placed within the interface between the inlet duct and the inlet plenum.

A FOD barrier or screen of this type typically exhibits stability and integrity problems that make it unreliable at best and the source of FOD itself at worst. Consequently, an alternative inlet design utilises an inlet plenum that comprises a perforated inlet (PI) baffle. The PI baffle comprises a generally cylindrical baffle within the inlet plenum that circumscribes the generally annular inlet of the compressor. The airflow must pass through a plurality of apertures or perforations in the baffle, each aperture small enough to block foreign matter within the airflow greater than a critical size that may cause FOD to the compressor impeller.

However, the generally small wall thickness of a PI baffle offers almost no flow guidance compared to guide vanes. This generally results in significant flow distortion of the airflow to the compressor inlet and significant flow pressure losses across the apertures or perforations in the PI baffle. Choosing different sizes, shapes and distributions of the apertures or perforations along the perimeter or surface of the PI baffle could possibly reduce such flow distortion, but production and verification of structural integrity for such a PI baffle would be difficult and costly.

SUMMARY OF THE INVENTION

The invention generally comprises an inlet plenum for coupling airflow from a radial airflow inlet to an axial compressor inlet for a compressor, the inlet compressor comprising a perforated inlet (PI) baffle that comprises a generally cylindrical baffle that circumscribes the compressor inlet and a plurality of apertures, each aperture perforating the baffle to pass the airflow from the radial airflow inlet to the compressor inlet and a plurality of stagnation vanes, each stagnation vane comprising a generally arc-shaped vane that extends proximate the PI baffle to establish an approximation of stagnant flow around the entire PI baffle to reduce flow distortion of the airflow between the radial airflow inlet and the axial compressor.

DETAILED DESCRIPTION OF THE INVENTION

Figure 1:
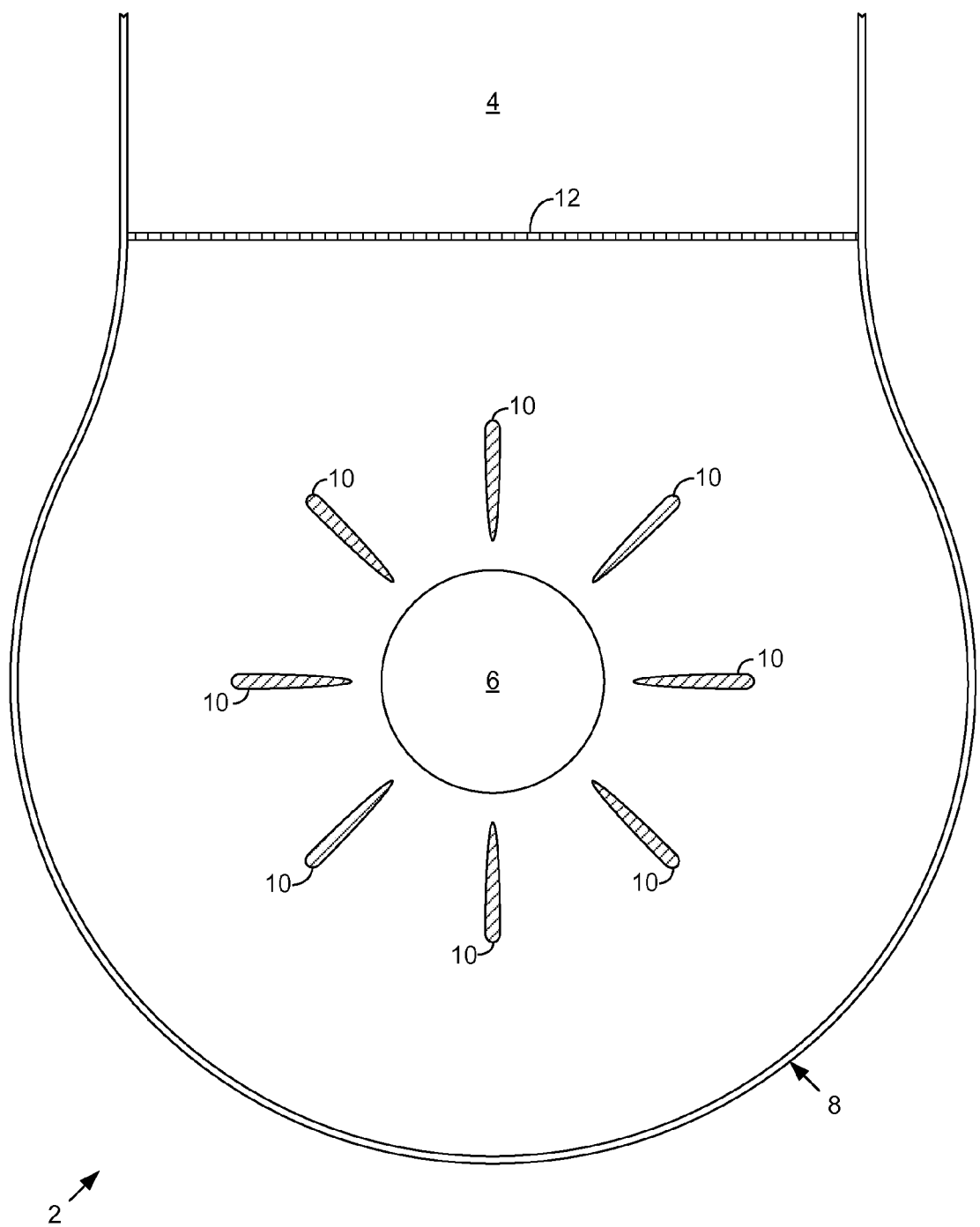
FIG. 1 is a partial cut-away end view of a gas turbine engine with a radial airflow inlet, an axial compressor inlet and an inlet plenum that couples the airflow inlet to the compressor inlet through inlet guide vanes according to the prior art.

FIG. 1 is a partial cut-away end view of a gas turbine engine 2 with a radial airflow inlet 4, an axial compressor inlet 6 and an inlet plenum 8 that couples the airflow inlet 4 to the compressor inlet 6 through at least one inlet guide vane 10 according to the prior art. FIG. 1 shows an arrangement with eight of the inlet guide vanes 10 as an illustrative example. The purpose of the inlet guide vanes 10 is to guide and deflect the airflow within the inlet plenum 8 that propagates radially from the airflow inlet 4 axially into the compressor inlet 6 with minimal circumferential flow variation about the perimeter of the compressor inlet 6. A FOD barrier or screen 12, typically comprising a wire screen, mounts upstream of the inlet plenum 8 across the airflow inlet 4 to block the passage of foreign matter greater than a critical size that may cause FOD to a compressor impeller (not shown) that the compressor inlet 6 feeds.

Figure 2:
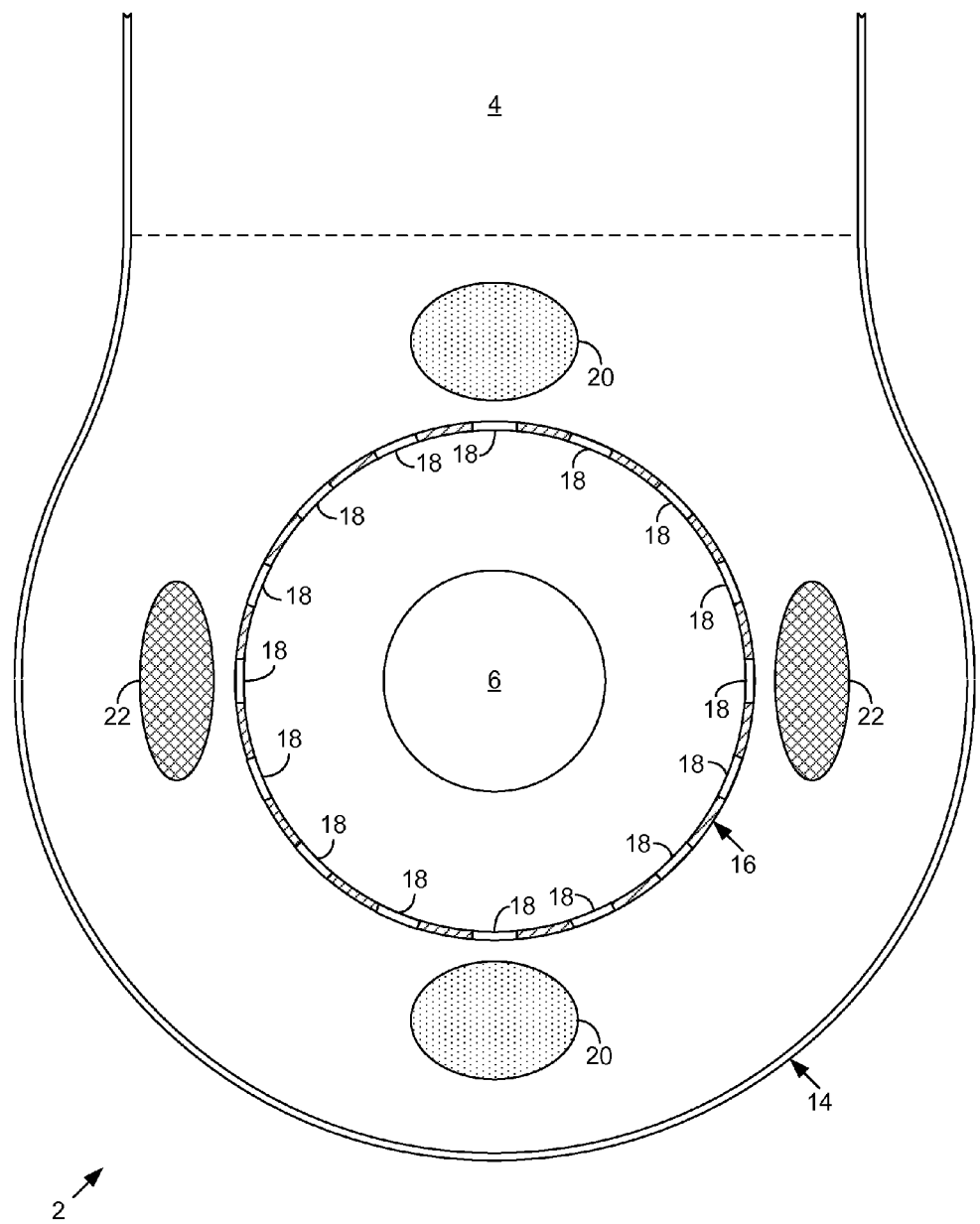
FIG. 2 is a partial cut-away end view of a gas turbine engine with a radial airflow inlet, an axial compressor inlet and an inlet plenum that couples the airflow inlet to the compressor inlet through a perforated inlet (PI) baffle according to the prior art.

FIG. 2 is a partial cut-away end view of a gas turbine engine 2 with a radial airflow inlet 4, an axial compressor inlet 6 and an inlet plenum 14 that couples the airflow inlet to the compressor inlet 6 with a perforated inlet (PI) baffle 16 according to the prior art. The PI baffle 16 comprises a generally cylindrical baffle that circumscribes the compressor inlet 6 and has a plurality of apertures or perforations 18 that passes through it. The apertures 18 pass the airflow from the radial airflow inlet 4 to the compressor inlet 6. Each aperture 18 is small enough to block foreign matter within the airflow greater than a critical size that may cause FOD to the compressor impeller.

Unfortunately, the PI baffle 16 is generally ineffective for guiding airflow from the radial airflow inlet 4 to the axial compressor inlet 6 without significant flow distortion. The PI baffle 16 generally has a relatively large diameter relative to the axial compressor inlet 6 to assure reasonably low flow velocities through the apertures 18 and low pressure losses across the PI baffle 16. However, such a PI baffle 16 introduces flow stagnation regions 20 and increased velocity regions 22. Guide vanes, such as the guide vanes 10 in FIG. 1, placed either upstream or downstream of the PI baffle 16 are generally ineffective for controlling airflow in a manner that reduces such flow distortion. Furthermore, placement of such guide vanes 10 downstream of the PI baffle 16 makes them subject to ice formation upon their surfaces. This ice may then break loose and cause damage to the compressor impeller.

Ideally, to achieve low exit flow distortion and low pressure losses across the PI baffle 16 for a given configuration of the inlet plenum 14, the flow through each aperture 18 should be similar and perpendicular through each aperture 18 independent of the total mass flow rate. In order to achieve this, ideally the flow upstream and around the PI baffle 16 should be stagnant. For a given finite size of the inlet plenum 14, this is not the case. The flow just upstream from the apertures 18 and the flow angle at the inlet of each aperture 18 swill around the PI baffle 16 causing flow distortion and increased pressure losses across each aperture 18 if the flow is not perpendicular to each aperture 18.

In order to obtain uniform flow conditions downstream of the PI baffle 16 and consequently at the axial compressor outlet 6, uniform stagnant flow conditions upstream and around the perimeter of the PI baffle 16 are desirable, assuming that pressure losses due to flow deceleration remain at an acceptable level. Stagnation conditions upstream of the PI baffle 16 guarantee that velocity vectors and pressure contour lines do not vary circumferentially downstream of the PI baffle 16, with exception of the jet/wake structure generated when the flow accelerates through the apertures 18.

Figure 3:
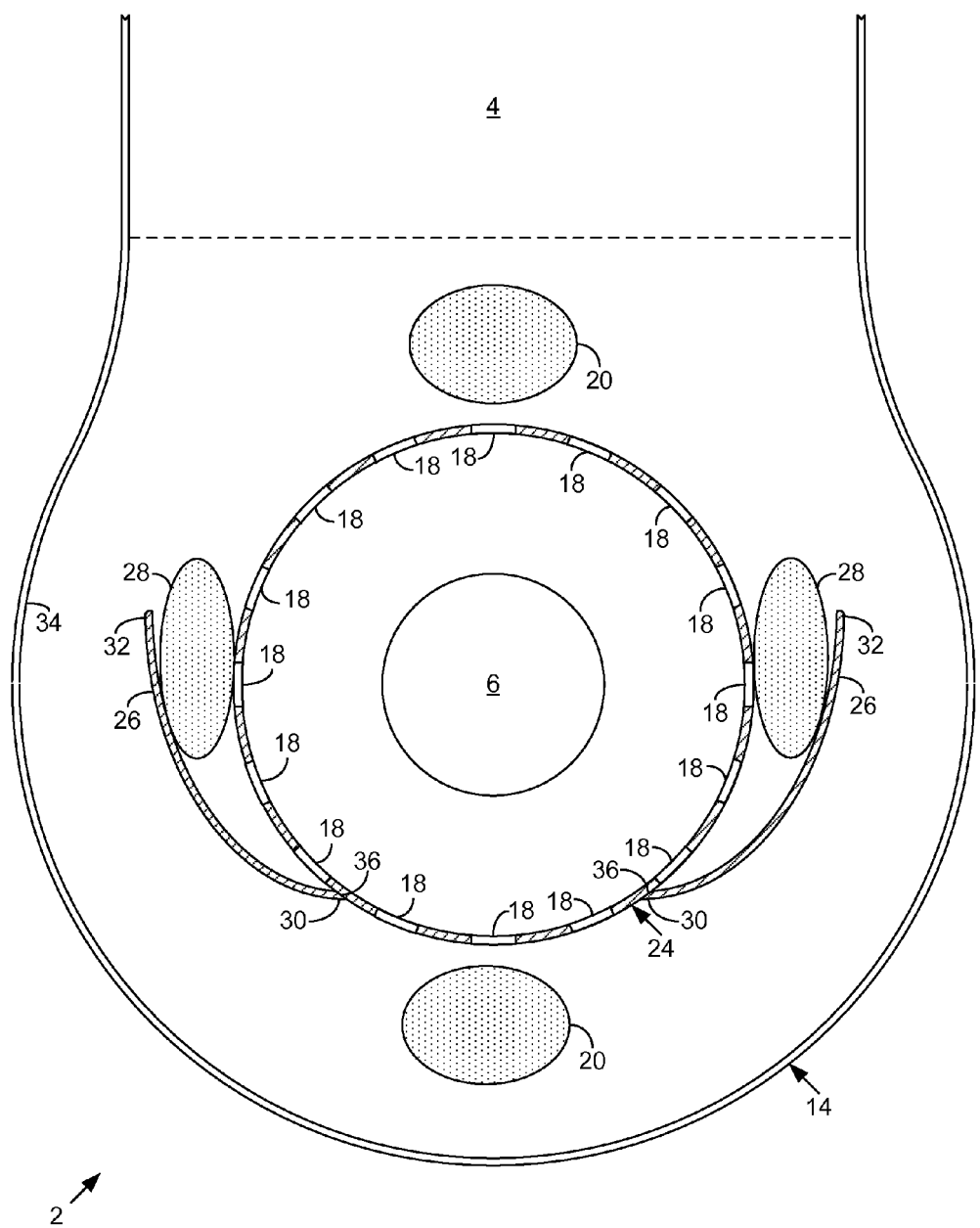
FIG. 3 is a partial cut-away end view of a gas turbine engine with a radial airflow inlet, an axial compressor inlet and an inlet plenum that couples the airflow inlet to the compressor inlet through a perforated inlet (PI) baffle and upstream stagnation vanes according to a possible embodiment of the invention.

FIG. 3 is a partial cut-away end view of a gas turbine engine 2 with a radial airflow inlet 4, an axial compressor inlet 6 and an inlet plenum 14 that couples the airflow inlet 4 to the compressor inlet 6 through a perforated inlet (PI) baffle 24 according to a possible embodiment of the invention. A plurality of stagnation vanes 26 arranged along the perimeter of the PI baffle 24 generates additional flow stagnation regions 28 that replace the undesirable increased velocity regions 22 without such stagnation vanes as shown in FIG. 2. FIG. 3 shows two of the stagnation vanes, although the inlet plenum 14 may alternatively have a different number of stagnation vanes 26 to establish an approximation of stagnant flow conditions around the entire PI baffle 16 as shown. The two stagnation vanes 26 comprise generally arc-shaped vanes. Each stagnation vane 26 extends from a first end 30 proximate the PI baffle 24 to a second end 32 upstream in the airflow and outwardly toward an outer wall 34 of the inlet plenum 14. In FIG. 3, each first end attaches to the PI baffle 24 at an attachment point 36. The shape of these stagnation vanes 26 and their placement within the inlet plenum 14 relative to the PI baffle 16 are crucial in order to prevent flow separation behind the stagnation vanes 26 and/or enhanced jet flow through the apertures 18 near the first end 30 of each stagnation vane 26.

The described embodiment of the invention is only an illustrative implementation of the invention wherein changes and substitutions of the various parts and arrangement thereof are within the scope of the invention as set forth in the attached claims.

The claimed invention is:

1. An inlet plenum for coupling airflow from a radial airflow inlet to an axial compressor inlet for a compressor, comprising:
   a perforated inlet (PI) baffle that comprises a generally cylindrical baffle that circumscribes the compressor inlet and a plurality of apertures, each aperture perforating the baffle to pass the airflow from the radial airflow inlet to the compressor inlet; and
   a plurality of stagnation vanes, each stagnation vane comprising a generally arc-shaped vane that extends proximate the PI baffle to establish an approximation of stagnant flow around the entire PI baffle to reduce flow distortion of the airflow between the radial airflow inlet and the axial compressor inlet.

2. The inlet plenum of claim 1, wherein each stagnation vane has a first end proximate the PI baffle and a second end that extends upstream in the airflow and outwardly toward an outer wall of the inlet plenum.

3. The inlet plenum of claim 2, wherein the shape of each stagnation vane and the position of its first end proximate the PI baffle prevent flow separation behind the stagnation vanes.

4. The inlet plenum of claim 2, wherein the shape of each stagnation vane and the position of its first end proximate the PI baffle enhances jet flow through the apertures in the PI baffle near its first end.

5. The inlet plenum of claim 2, wherein the first end of each stagnation vane attaches to the PI baffle at a corresponding attachment point.

6. The inlet plenum of claim 1, wherein the inlet plenum has two of the stagnation vanes.

7. The inlet plenum of claim 1, wherein each aperture in the PI barrier is small enough to block foreign matter within the airflow greater than a critical size that may cause foreign object damage (FOD) to a compressor impeller for the compressor.

8. An inlet plenum for coupling airflow from a radial airflow inlet to an axial compressor inlet for a compressor, comprising:
   a perforated inlet (PI) baffle that comprises a generally cylindrical baffle that circumscribes the compressor inlet and a plurality of apertures, each aperture perforating the baffle of such size to pass the airflow from the radial airflow inlet to the compressor inlet and block foreign matter within the airflow greater than a critical size that may cause foreign object damage (FOD) to a compressor impeller for the compressor; and
   two stagnation vanes, each stagnation vane comprising a generally arc-shaped vane with a first end proximate the PI baffle and a second end that extends upstream in the airflow and outwardly toward an outer wall of the inlet plenum to establish an approximation of stagnant flow around the entire PI baffle to reduce flow distortion of the airflow between the radial airflow inlet and the axial compressor inlet.

9. The inlet plenum of claim 8, wherein the shape of each stagnation vane and the position of its first end proximate the PI baffle prevent flow separation behind the stagnation vanes.

10. The inlet plenum of claim 8, wherein the shape of each stagnation vane and the position of its first end proximate the PI baffle enhances jet flow through the apertures in the PI baffle near its first end.

11. A gas turbine engine, comprising:
   a compressor with an axial compressor inlet;
   a radial airflow inlet for supplying ambient air to the compressor; and
   an inlet plenum for coupling airflow from the radial airflow inlet to the axial compressor inlet for a compressor that comprises a perforated inlet (PI) baffle that comprises a generally cylindrical baffle that circumscribes the compressor inlet and a plurality of apertures, each aperture perforating the baffle to pass the airflow from the radial airflow inlet to the compressor inlet; and a plurality of stagnation vanes, each stagnation vane comprising a generally arc-shaped vane that extends proximate the PI baffle to establish an approximation of stagnant flow around the entire PI baffle to reduce flow distortion of the airflow between the radial airflow inlet and the axial compressor inlet.

12. The gas turbine engine of claim 11, wherein each stagnation vane has a first end proximate the PI baffle and a second end that extends upstream in the airflow and outwardly toward an outer wall of the inlet plenum.

13. The gas turbine engine of claim 12, wherein the shape of each stagnation vane and the position of its first end proximate the PI baffle prevent flow separation behind the stagnation vanes.

14. The gas turbine engine of claim 12, wherein the shape of each stagnation vane and the position of its first end proximate the PI baffle enhances jet flow through the apertures in the PI baffle near its first end.

15. The gas turbine engine of claim 12, wherein the first end of each stagnation vane attaches to the PI baffle at a corresponding attachment point.

16. The gas turbine engine of claim 11, wherein the inlet plenum has two of the stagnation vanes.

17. The gas turbine engine of claim 11, wherein each aperture in the PI barrier is small enough to block foreign matter within the airflow greater than a critical size that may cause foreign object damage (FOD) to a compressor impeller for the compressor.

* * * * *